US007358315B2

(12) United States Patent
Tei et al.

(10) Patent No.: US 7,358,315 B2
(45) Date of Patent: *Apr. 15, 2008

(54) THERMOPLASTIC ALLYLOXYMETHYLSTYRENE-BASED RESIN

(75) Inventors: Youichi Tei, Tokyo (JP); Toshiyuki Kodaira, c/o Fukui University, 9-1 Bunkyo 3-chome, Fukui-shi, Fukui (JP) 910-8507

(73) Assignees: Fuji Electric Device Technology Co., Ltd., Tokyo (JP); Toshiyuki Kodaira, Fukui (JP)

( * ) Notice: Subject to any disclaimer, the term of this patent is extended or adjusted under 35 U.S.C. 154(b) by 174 days.

This patent is subject to a terminal disclaimer.

(21) Appl. No.: 10/706,987

(22) Filed: Nov. 14, 2003

(65) Prior Publication Data

US 2004/0106756 A1     Jun. 3, 2004

(30) Foreign Application Priority Data

Nov. 14, 2002   (JP)   .............................. 2002-331197

(51) Int. Cl.
    *C08F 12/34*   (2006.01)
(52) U.S. Cl. ...................... 526/336; 526/333
(58) Field of Classification Search ................ 526/333, 526/336
    See application file for complete search history.

(56) References Cited

U.S. PATENT DOCUMENTS

| 4,772,583 | A  | 9/1988 | Sprecker et al. |
| 6,939,595 | B2 | 9/2005 | Tei et al. |

FOREIGN PATENT DOCUMENTS

| JP | 53-126322  | 11/1978 |
| JP | 63-154768  | 6/1988  |
| JP | 07-153060  | 6/1995  |
| JP | 07-210855  | 8/1995  |
| JP | 09-085743  | 3/1997  |
| JP | 2000-153535 | 6/2000 |

OTHER PUBLICATIONS

Butler et al. Polymer Preprints (ACS) (1970), 11(1), 48-52.*
J. Villieras and M. Rambaud, "Wittig-Horner Reaction in Heterogeneous Media; I. An Easy Synthesis of Ethyl α—Hydroxymethylacryate and Ethyl α -Halomethylacrylates using Formaldehyde in Water", Synthesis, (1982) p. 924-926.
L. F. Hatch and T.L. Patton, "Allylic Chlorides. XXI. 3-Chloro-2-phenyl-Ipropene", J.Am. Chem. Soc., 27,(1954) p. 2705-2707.
H. Lee et al., "Radical Cyclopolymerization of Bis (2-phenylallyl)ether", p. 196, Nov. 17, 2002.
Hiroki Nakai et al., "Radical cyclopolymerization of α-allyloxymethylstyrene", p. 197, Nov. 17, 2002.

Hyun-jin Lee et al., "Radical Cyclopolymerization of Bis(2-phenylally)ether-Synthesis and Properties of Highly Cyclized Polymers Obtained Using a Functional Group with Low Homoploymerizability", p. 164, May 28, 2003.
Hyun-Jin Lee et al., "Cyclopolymerization of a 1,6-Diene with 2-Phenylallyloxy Group and Properties of the Polymers Derived Therefrom", p. 1220, Sep. 24, 2003.
Briot et al. , "Improvement in Olefin Metathesis Using a New Generation of Ruthenium Catalyst Bearing an Imidazolylidene Ligand: Synthesis of Heterocycles," Organic Letters, vol. 2, No. 11, pp. 1517-1519 (2000).
Butler, "Radical Cyclo- and Cyclocopolymerization," Journal of Polymer Science: Polymer Symposium, No. 64, pp. 71-93 (1978).
Butler et al. "The Fundamental Basis for Cyclopolymerization. IX A Cyclopolymerization Study of Certain Unsymmetrical 1,6-Heptadienes," Journal of Macromolecular Sciences, Chemistry, vol. A8, No. 7, pp. 1239-1247 (1974).
Baucom, Keith B. and Butler, George B., "The Fundamental Basis for Cyclopolymerization VIII., An Ultraviolet Spectral Study of Certain Unsymmetrical 1,6-Heptadienes", J. Macromol Sci-Chem., US, 1974, A8 (7), pp. 1205-1238.
Kodaira, T. and F. Aoyama, "Cyclopolymerization. II. Mechanism of the Free-Radical Polymerization of N-n-Propyldimethacrylamide", *Journal of Polymer Science*, Polymer Chemistry Edition, vol. 12 (1974), p. 897-910.
Kodaira, T., "Structural Control During the Cyclopolymerization of Unconjugated Dienes", *Progress in Polymer Science*, vol. 25 (2000), p. 627-676.

* cited by examiner

*Primary Examiner*—Helen L Pezzuto
(74) *Attorney, Agent, or Firm*—Venable LLP; Marina V. Schneller

(57) ABSTRACT

A thermoplastic allyloxymethylstyrene-based resin comprising structural units of the following formulas (I) and (II):

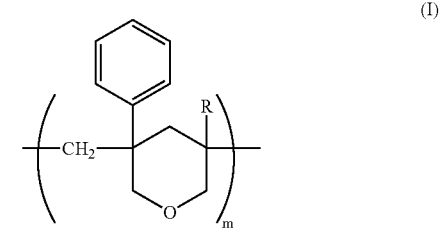

(I)

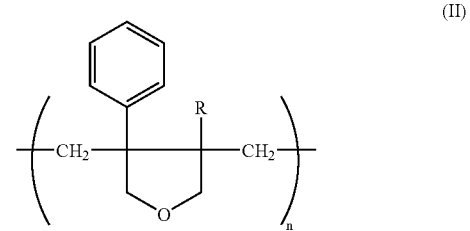

(II)

as repeating units, wherein R represents a hydrogen atom or a hydrocarbon group, and m and n each denote an integer of 0 or 1 or higher, provided that m and n are not 0 at the same time.

6 Claims, No Drawings

THERMOPLASTIC ALLYLOXYMETHYLSTYRENE-BASED RESIN

This application claims priority from Japanese Patent Application No. 2002-331197filed Nov. 14, 2002, which is incorporated hereinto by reference.

BACKGROUND OF THE INVENTION

1. Field of the Invention

This invention relates to allyloxymethylstyrene-based resin. In particular, this invention relates to a phenylallyloxymethylstyrene resin and an allyloxymethylstyrene resin, which are composed of repeating structural units derived from a phenylallyloxymethylstyrene monomer and an allyloxymethylstyrene monomer, respectively, and which have excellent heat resistance, humidity resistance and moldability, and to a method for production thereof.

2. Description of the Related Art

Thermoplastic resins are used as molding materials in a wide range, including electric and electronic component materials and medical care materials. With the progress of technologies, a demand for products with higher performance and higher characteristics such as reliability is growing. Accordingly, the presence of thermoplastic resins with higher resistance to heat and humidity is desired.

So far, materials using polymethacrylate resins (PMMA) and polycarbonate resins (PC) (for example, Japanese Patent Application Laid-open No. 2000-153535) have been known as polymeric materials for optical use or for recording media. Although polymethacrylate resins and polycarbonate resins are excellent in transparency, those are problematical in heat resistance and humidity resistance.

In recent years, Japanese Patent Application Laid-open Nos. 7-153060 (1995), 7-210855 (1995) and 9-85743 (1997) disclose norbornene-based polyolefin resins as polymeric materials improved in these drawbacks, and show that these resins have relatively good properties, such as heat resistance and humidity resistance, in comparison with PMMA and PC.

However, the existing polymeric materials are still insufficient in satisfying stricter performance requirements imposed in recent years, including higher performance and higher reliability.

SUMMARY OF THE INVENTION

It is an object of the present invention to provide a high-performance polymeric material having higher stability to heat and lower hygroscopicity by use of a polymeric material retaining an appropriate molecular structure and appropriate physical properties.

It is another object of the present invention to provide a molded article having high performance and high reliability by processing the above polymeric material under appropriate molding conditions.

The appropriate structure herein refers to a rigid three-dimensional stereochemical structure such as a cyclic structure. The appropriate physical properties refer to a high glass transition point (high Tg) closely related to mechanical strength characteristics, high thermal stability (high thermal decomposition temperature) permitting high flow molding, and low hygroscopicity (minimal swelling, deformation or deterioration due to moisture absorption). The appropriate molding conditions refer to high flow molding conditions which suppress the occurrence of residual stress of the resulting molded article and ensure its high surface accuracy.

More specifically, the use of a thermoplastic allyloxymethylstyrene-based resin, which is a completely novel polymeric material having all of the above-mentioned physical properties, makes it possible to achieve a high resin melt temperature, permit the material to be molded at a high mold temperature and solve the problems.

That is, a first aspect of the present invention is a thermoplastic allyloxymethylstyrene-based resin comprising structural units of the following formulas (I) and (II):

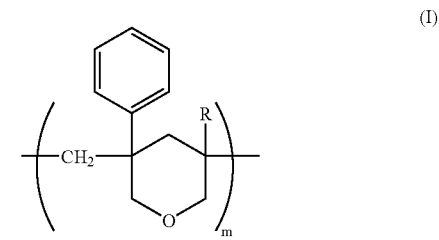

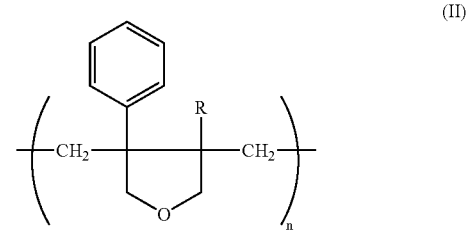

as repeating units, wherein R represents a hydrogen atom or a hydrocarbon group, and m and n each denotes an integer of 0 or 1 or higher, provided that m and n are not 0 at the same time.

In the thermoplastic allyloxymethylstyrene-based resin, R in the formulas (I) and (II) is preferably phenyl or hydrogen.

A second aspect of the present invention is a thermoplastic resin obtained by polymerizing a monomer having a structure of the following formula (III):

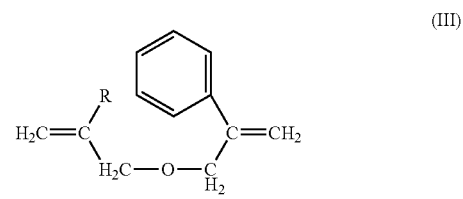

wherein R represents a hydrogen or a hydrocarbon group.

In the thermoplastic resin, R in the formula (III) is preferably phenyl or hydrogen. Moreover, if R in the formula (III) is phenyl, the degree of cyclization in the thermoplastic resin is preferably 90% or higher, or if R in the formula (III) is hydrogen, the degree of cyclization in the thermoplastic resin is preferably 80% or higher. Furthermore, the glass transition temperature (Tg) of the thermoplastic resin is preferably 180° C. or higher, but lower than 270° C. if R is phenyl in the formula (III). The Tg is preferably 100° C. or higher, but lower than 125° C. if R is hydrogen in the formula (III).

In addition, it is preferred in the thermoplastic resin that the thermal decomposition point is 350° C. or higher, and the moisture content is less than 0.01%.

The above and other objects, effects, features and advantages of the present invention will become more apparent from the following description of embodiments thereof.

DETAILED DESCRIPTION OF PREFERRED EMBODIMENTS

The "allyloxymethylstyrene-based resin", as used herein, refers to a thermoplastic resin comprising structure of the aforementioned formulas (I) and (II):

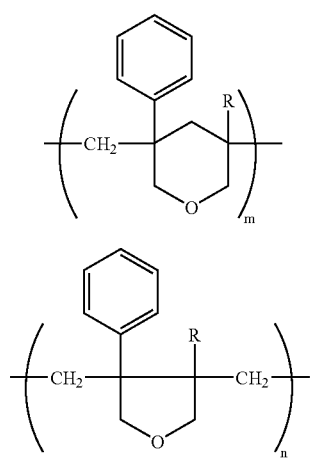

as repeating units, wherein R represents a hydrogen atom or a hydrocarbon group, and m and n each denote an integer of 0 or 1 or higher, provided that m and n are not 0 at the same time.

Examples of the hydrocarbon group as R are, but not limited to, alkyl groups such as methyl and ethyl, cycloalkyl groups such as cyclopropyl, cyclobutyl, cyclopentyl and cyclohexyl, aryl groups such as phenyl and naphthyl, and aromatic heterocyclic groups such as pyridyl and furyl. Preferably, R is hydrogen or phenyl.

The phenyl groups in the formulas (I) and (II) may be optionally substituted, as long as the effects of the present invention are exhibited. Examples of the substituents in this case are lower alkyl groups such as methyl and ethyl.

Next, an outline of the method for synthesizing the thermoplastic allyloxymethylstyrene-based resin will be offered.

The thermoplastic allyloxymethylstyrene-based resin of the present invention is obtained by polymerizing a monomer having a structure of the following formula (III):

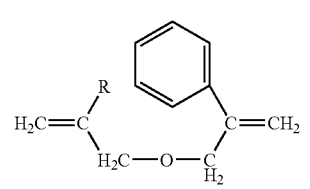

wherein R represents a hydrogen atom or a hydrocarbon group.

Examples of the hydrocarbon group as R are, but not limited to, alkyl groups such as methyl and ethyl, cycloalkyl groups such as cyclopropyl, cyclobutyl, cyclopentyl and cyclohexyl, aryl groups such as phenyl and naphthyl, and aromatic heterocyclic groups such as pyridyl and furyl. Preferably, R is hydrogen or phenyl.

The phenyl group in the formula (III) may be optionally substituted, as long as the effects of the present invention are exhibited. Examples of the substituent in this case are lower alkyl groups such as methyl and ethyl.

The method of synthesizing the phenylallyloxymethylstyrene resin and the allyloxymethylstyrene resin will be briefly described as specific examples, but it will be possible for people skilled in the art to synthesize the resins having other substituents based on the disclosure of the present invention.

As the method for synthesizing the phenylallyloxymethylstyrene resin, an explanation will be offered for a method which comprises synthesizing phenylallyloxymethylstyrene monomer and polymerizing the monomer.

Phenylallyloxymethylstyrene monomer can be obtained by mixing tetranormalbutylammonium bromide, as a phase transfer catalyst, for example, with 2 parts by weight of α-hydroxymethylstyrene and 1 part by weight of α-bromomethylstyrene, and reacting the mixture for 50 hours or more at a constant temperature in basicity. From the resulting product, phenylallyloxymethylstyrene monomer is isolated and purified.

Then, a predetermined amount of the phenylallyloxymethylstyrene monomer obtained by the above method, and a polymerization initiator such as 2,2'-azobisisobutyronitrile or cumene hydroperoxide are mixed into a polymerization tube. The tube is sealed in an atmosphere of nitrogen, or after a freeze-pump-thaw cycle is repeated several times for a predetermined time, the tube is sealed in a vacuum. Then, the reaction mixture is allowed to stand for several hours at a predetermined temperature to carry out polymerization. Then, the reaction mixture is rapidly cooled to give a thermoplastic phenylallyloxymethylstyrene resin.

Next, a method, which comprises synthesizing allyloxymethylstyrene monomer and polymerizing the monomer, will be described as the method for synthesizing the allyloxymethylstyrene resin.

Allyloxymethylstyrene monomer can be obtained by mixing, for example, 0.5 part by weight of tetranormalbutylammonium bromide, as a phase transfer catalyst, with 1 part by weight of α-hydroxymethylstyrene and 10 parts by weight of allyl bromide, and reacting the mixture for 50 hours or more at a constant temperature in basicity. From the resulting product, allyloxymethylstyrene monomer is isolated and purified.

Then, a predetermined amount of the allyloxymethylstyrene monomer obtained by the above method, and a polymerization initiator such as 2,2'-azobisisobutyronitrile or cumene hydroperoxide are mixed into a polymerization tube. The tube is sealed in an atmosphere of nitrogen, or after a freeze-pump-thaw cycle is repeated several times for a predetermined time, the tube is sealed in a vacuum. Then, the reaction mixture is allowed to stand for several hours at a predetermined temperature to carry out polymerization. Then, the reaction mixture is rapidly cooled to give a thermoplastic allyloxymethylstyrene resin.

Examples of the phase transfer catalyst, other than the above-mentioned tetranormalbutylammonium bromide, are, but not limited to, tetranormalbutylammonium chloride, tetranormalbutylammonium hydrogensulfate, crown ether+ KCl, and crown ether+KBr.

Examples of the polymerization initiator are, but not limited to, azo compounds, other than the above-mentioned 2,2'-azobisisobutyronitrile, such as
2,2'-azobis-2-methylbutyronitrile,
2,2'-azobis-2-methylvaleronitrile,
2,2'-azobis-2,3-dimethylbutyronitrile,
2,2'-azobis-2-methylhexanenitrile,
2,2'-azobis-2,4-dimethylvaleronitrile,
2,2'-azobis-2,3,3-trimethylbutyronitrile,
2,2'-azobis-2-methylheptanenitrile,
2,2'-azobis-2-cyclopropylpropionitrile,
2,2'-azobis-2-cyclopentylpropionitrile,
2,2'-azobis-2-benzylpropionitrile,
2,2'-azobis-2-(4-nitrobenzyl)propionitrile,
2,2'-azobis-2-cyclobutylpropionitrile,
2,2'-azobis-2-cyclohexylpropionitrile,
2,2'-azobis-2-(4-chlorobenzyl)propionitrile,
2,2'-azobis-2-ethyl-3-methylvaleronitrile,
2,2'-azobis-2-isopropyl-3-methylvaleronitrile,
2,2'-azobis-2-isobutyl-4-methylvaleronitrile,
1,1'-azobis-1-cyclohexanenitrile,
1,1'-azobis-1-cyclobutanenitrile,
2,2'-azobis-2-carbomethoxypropionitrile, and
2,2'-azobis-2-carboethoxypropionitrile; and peroxides, other than the aforementioned cumene hydroperoxide, such as methyl ethyl ketone peroxide, cyclohexanone peroxide, bis-(1-oxycyclohexyl) peroxide, acetyl peroxide, capryl peroxide, lauroyl peroxide, stearoyl peroxide, benzoyl peroxide, p,p'-dichloro-benzoyl peroxide, (2,4,2',4'-tetrachloro)-benzoyl peroxide, di-t-butyl peroxide, di-t-amyl peroxide, t-butyl-cumyl peroxide, dicumyl peroxide, 2,5-dimethyl-2,5-di(t-butyl peroxide)-hexane, t-butyl hydroperoxide, p-menthane hydroperoxide, 2,5-dimethyl-2,5-dihydroperoxide-hexane, t-butyl peracetate, t-butyl perisobutyrate, t-butyl perpivalate, t-butyl perbenzoate, di-t-butyl perphthalate, 2,5-dimethyl(2,5-benzoylperoxy)-hexane, t-butyl permaleate, i-propyl percarbonate, t-butylperoxy-i-propyl carbonate, and succinic acid peroxide.

The degree of cyclization for the thermoplastic allyloxymethylstyrene-based resin can be controlled according to the type and the amount of addition of the polymerization initiator, and further the polymerization temperature or the polymerization time. To retain the predetermined glass transition point (Tg) and heat stability as a thermoplastic resin, the degree of cyclization of the resulting thermoplastic phenylallyloxymethylstyrene resin needs to be 90% or higher, more desirably 99% or higher, while the degree of cyclization of the resulting thermoplastic allyloxymethylstyrene resin needs to be 80% or higher, more desirably 88% or higher.

The degree of cyclization is determined by the ratio between the absorption intensity of phenyl protons and the absorption intensity of pendant olefins of each polymer that are obtained by NMR (nuclear magnetic resonance) measurement.

If the degree of cyclization of the thermoplastic allyloxymethylstyrene-based resin is low, this means that many pendant olefin structural moieties, which have not been cyclized, are present in the repeating units of the polymer. As a result, there will be a decrease in the molecular weight, and declines in the glass transition point (Tg) and heat stability as a thermoplastic resin. Eventually, the drawbacks occur that the mechanical strength, thermal stability, shape stability and predetermined surface accuracy as an injection molded article fail to be obtained.

The glass transition point (Tg) of the thermoplastic allyloxymethylstyrene-based resin is obtained by thermomechanical analysis (TMA) or differential scanning calorimetry (DSC). With DSC, for example, Tg is measured within the temperature range of −50° C. to 300° C. at a heating rate of 5° C./min.

The glass transition point (Tg) of the thermoplastic allyloxymethylstyrene-based resin varies with the molecular weight or the degree of cyclization, and Tg is 100° C. or higher at a degree of cyclization of 80% or higher. Specifically, the thermoplastic phenylallyloxymethylstyrene resin controlled with a degree of cyclization of 90% or higher, has 180° C.<Tg<270° C., preferably 200° C.<Tg<270° C. The thermoplastic allyloxymethylstyrene resin controlled with a degree of cyclization of 88% or higher, has Tg of 100° C. or higher. A molded article, which is obtained by injection molding the thermoplastic phenylallyloxymethylstyrene resin or the thermoplastic allyloxymethylstyrene resin with the glass transition point within this range can retain sufficient mechanical strength, heat stability, shape stability and predetermined surface accuracy.

The molecular weight (Mn) of the thermoplastic allyloxymethylstyrene-based resin is preferably 1,500 to 30,000, more preferably 2,000 to 25,000, even more preferably 3,000 to 20,000.

The heat stability of the thermoplastic allyloxymethylstyrene-based resin is determined by thermogravimetric analysis (TG). For this determination, a thermogravimetric analyzer ("TG/DTA220", Seiko Instruments Inc., Japan) is used, and the temperature at which a weight loss of 0.5% occurs under heat, is determined as a thermal decomposition point under the conditions of a sample amount of 5 mg±0.5, an $N_2$ flow rate of 200 ml/min, a measurement temperature of 30 to 600° C., and a heating temperature of 10° C./min.

The thermal decomposition point of the thermoplastic allyloxymethylstyrene-based resin also varies with the aforementioned degree of cyclization, etc., and is preferably 350° C. or higher. Specifically, the thermoplastic phenylallyloxymethylstyrene resin controlled with a degree of cyclization of 90% or higher, has the thermal decomposition point of 360° C. or higher. The thermoplastic allyloxymethylstyrene resin controlled with a degree of cyclization of 88% or higher, has the thermal decomposition point of 350° C. or higher. Even in high-temperature melt state during injection molding, deterioration of the low molecular weight components inferior in heat stability does not occur. Consequently, no defects measuring several micrometers to several tens of micrometers are produced on the surface of the injection molded product, which can retain sufficient surface accuracy.

The moisture content of the thermoplastic allyloxymethylstyrene-based resin is determined by Karl Fischer analysis or thermal desorption mass spectrometry (TDS). With TDS, for example, the moisture content can be determined by measuring $H_2O$ gas (M/Z=18), which is generated during resin melt at 30° C. to 400° C. in a vacuum at a heating rate of 5° C./min, by a quadruple mass spectrometer.

The moisture content of the thermoplastic allyloxymethylstyrene-based resin depends greatly on the chemical structure of this resin. That is, there are no polar functional groups in the structural units, and stereostructures, such as a cyclic phenylallyloxymethylstyrene structure and a cyclic allyloxymethylstyrene structure, are polymerized in the resin. These features result in low hygroscopicity, which is reflected in the moisture content. A moisture content of 0.01% or less can be retained by the thermoplastic phenylallyloxymethylstyrene resin and the thermoplastic allyloxymethylstyrene resin having a structure, a formula and physical properties controlled to achieve the aforementioned degree of cyclization and thermal decomposition temperature. As a result, a molded article obtained by injection molding can be a product with high environmental reliability which shows no morphological changes associated with moisture absorption, for example, in environmental stability tests allowing the molded article to stand under high temperature, high humidity conditions, or which shows no defects on the surface of the molded article in condensation formation tests involving transfer from high temperature, high humidity conditions to low temperature, low humidity conditions.

The thermoplastic allyloxymethylstyrene-based resin of the present invention can be molded by a well-known molding method, such as injection molding, extrusion, inflation molding, blow molding, injection blow molding, press molding, rotational molding, cutting molding, vacuum molding, rolling, cast molding, or calendaring.

In molding the thermoplastic allyloxymethylstyrene-based resin of the present invention, the following substances may be incorporated with the aim of improving the physical properties such as moldability, charging properties, melt flow characteristics, mechanical strength, flexibility, impact resistance, adhesion of a coating agent, weather resistance, humidity resistance, light blocking properties, fire retardancy, creep resistance, surface hardness, thermal expansibility, and elasticity: antioxidants such as phenolic or phosphorus-based compounds; ultraviolet stabilizers such as benzophenones or hindered amines; antistatic agents such as amines; lubricants such as esters of aliphatic alcohols; plasticizers such as phthalates; additives such as dyes, pigments, flame retardants and slip agents; fine particulate fillers such as silica, alumina, talc, aluminum hydroxide, carbon, amorphous carbon, graphite, and calcium carbonate; and fibrous fillers such as glass fiber, carbon fiber, boron fiber, silicon carbide fiber, asbestos fiber, potassium titanate crystal fine fiber, quartz fiber, metallic fiber, carbon fibril, polyamide fiber, polyester fiber, fluoroplastics fiber, cotton fiber, cellulose fiber, and silicon fiber.

Other resins can be mixed unless the objects of the present invention are impaired. For example, norbornene-based polyolefin resins, polycarbonate resins, and polymethyl methacrylate resins can be mixed.

The thermoplastic allyloxymethylstyrene-based resin of the present invention is useful as various molded articles in wide varieties of fields, including substrate materials for optical and magnetic media. Examples include electric and electronic components, such as optical disks, information disks, magnetic disks, hard disks, optical cards, and electrophotographic photoconductors, optical components, such as optical lenses, eyeglass lenses, prisms, optical mirrors, optical fibers, beam splitters, liquid crystal display device substrates, light-guiding plates, polarization films, phase difference films, OHP films, light diffusion plates, light emitting device encapsulated light diffusion plates, back lights for liquid crystal, and pipe materials for fluorescent tubes; equipments for medical care, for example, containers for liquid or solid pharmaceuticals, such as chemical liquid containers, vials, ampules, pre-filled syringes, infusion bags, containers for solid drugs, containers for eye drops, containers for contrast media, and press-through packages, containers of samples, such as sampling containers for blood examinations, testing cells, blood sampling tubes, and sample containers, sterilized containers such as syringes and medical instruments, medical instruments such as beakers, laboratory dishes, flasks, test tubes, centrifugation tubes, contact lens cases, infusion tubes, piping, joints, and valves, and artificial organs, such as dental plate, artificial heart, non-return valves, and artificial tooth root, and their components; equipments for processing of electronic components, such as wafer carriers, hard disk carriers, information disk substrate carriers, liquid crystal substrate carriers, magnetic disk carriers, IC trays, IC carrier tapes, separation films, shippers, tanks, piping for ultrapure water, pipes, tubes, valves, flowmeters, filters, pumps, sampling containers, resist containers, and inner bags for resist containers; electrical wire coating materials, components for OA equipment, such as electronics, copiers, computers and printers, and general insulators for gauges, radars, antennas, and luminary lamp shades; electric components such as printed boards, flexible printed boards, multilayer printed boards, and high frequency circuit boards; base materials for conductive films; encapsulation materials for transistor, IC, LSI, LED, light diffusion plate, and LED having lenses integrally shaped; sealing materials for electrical components such as motors, capacitors, switches and sensors; housing materials for televisions, videos, video cameras, and cameras; and building components, such as sewage piping, waterworks piping, pipes, wall covering materials, floor covering materials, and ceiling covering materials.

EXAMPLES

The present invention will be described in further detail by way of the following Examples, but it is to be easily understood that the invention is not limited to these examples, and various changes and modifications can be made by those skilled in the art within the scope of the invention.

Example 1

Synthesis of Phenylallyloxymethylstyrene Monomer

First of all, α-hydroxymethylstyrene was prepared by the method disclosed in L. F. Hatch and T. L. Patton, J. Am. Chem. Soc., 27, 2705 (1954) (incorporated herein by reference). Then, a portion of this compound was used to prepare α-bromomethylstyrene in accordance with a conventional bromination method such as one disclosed by J. Villierras and M. Rambaud, Synthesis, 924 (1982) (incorporated herein by reference).

α-Bromomethylstyrene (193 g, 1 mol), 262 g (2 mols) of α-hydroxymethylstyrene, 1,000 ml of dichloromethane, and 15 g of tetranormalbutylammonium bromide were mixed. To the mixture, a solution of 140 g (3.5 mols) of sodium hydroxide in 1,000 ml of water was added dropwise. With vigorous stirring, the mixture was reacted for 50 hours at 40° C., and then the aqueous phase was washed with dichloromethane. Dichloromethane was removed, and the residue was subjected to vacuum distillation at 140° C. and 0.4 mmHg to give 100 g of product A. Since the resulting product was a mixture, it was purified by column chromatography using a hexane/dichloromethane eluent, whereby phenylallyloxymethylstyrene monomer was obtained.

Example 2

Synthesis of Phenylallyloxymethylstyrene Polymer 1

The phenylallyloxymethylstyrene monomer (100 ml) obtained in Example 1, and 0.006 mol of the polymerization initiator 2,2'-azobisisobutyronitrile (AIBN) were charged into a Pyrex polymerization tube. The polymerization tube was sealed under a nitrogen atmosphere, or after a freeze-pump-thaw cycle was performed three times, i.e., for 30 minutes, for 40 minutes and for 50 minutes, and the tube was sealed in a vacuum. Then, the reaction mixture was allowed to stand for 24 hours at 60° C. in a temperature-controlled bath to carry out polymerization. The polymerization was stopped by rapidly cooling the polymerization tube with ice. Then, the reaction mixture was poured into methanol as a precipitant to give a polymer as a white powder. The precipitated polymer was collected by filtration through a glass filter. Methanol was removed, and the residue was dried for 48 hours or more in a vacuum drying equipment to give phenylallyloxymethylstyrene polymer 1. Based on the ratio between the absorption intensity of phenyl protons and the absorption intensity of pendant olefins, detected by the H-NMR spectrum of the resulting polymer, the degree of cyclization was 90%. The glass transition point (Tg) determined by DSC analysis was 220° C., and the thermal decomposition point determined by TG analysis was 360° C. Moreover, TDS analysis showed the moisture content of this polymer to be 0.008%. The number average molecular weight (Mn) was 14,000.

Example 3

Synthesis of Phenylallyloxymethylstyrene Polymer 2

Phenylallyloxymethylstyrene polymer 2 was obtained in the same manner as in Example 2, except that 100 ml of the phenylallyloxymethylstyrene monomer, and 0.006 mol of cumene hydroperoxide (CHP) as a polymerization initiator were charged into the polymerization tube, and the polymerization temperature and the polymerization time were set at 120° C. and 24 hours, respectively. The degree of cyclization determined by the H-NMR spectrum of the resulting polymer was 96%. The glass transition point (Tg) determined by DSC analysis was 250° C., and the thermal decomposition point determined by TG analysis was 380° C. Moreover, TDS analysis showed the moisture content of this polymer to be 0.008%. The number average molecular weight (Mn) was 18,100.

Example 4

Synthesis of Phenylallyloxymethylstyrene Polymer 3

Phenylallyloxymethylstyrene polymer 3 was obtained in the same manner as in Example 2, except that 100 ml of the phenylallyloxymethylstyrene monomer, and 0.006 mol of cumene hydroperoxide (CHP) as a polymerization initiator were charged into the polymerization tube, and the polymerization temperature and the polymerization time were set at 140° C. and 9 hours. The degree of cyclization determined by the H-NMR spectrum of the resulting polymer was 99%. The glass transition point (Tg) determined by DSC analysis was 265° C., and the thermal decomposition point determined by TG analysis was 400° C. Moreover, TDS analysis showed the moisture content of this polymer to be 0.008%. The number average molecular weight (Mn) was 12,700.

Example 5

Synthesis of Allyloxymethylstyrene Monomer

Allyl bromide (233 g, 1.9 mols), 26 g (0.2 mol) of α-hydroxymethylstyrene, 1,000 ml of dichloromethane, and 3.4 g (0.01 mol) of tetranormalbutylammonium bromide were mixed with an aqueous sodium hydroxide solution prepared by dissolving 39 g of sodium hydroxide in 290 ml of water. The mixture was heated under ref lux for 50 hours at 50° C. After the reaction, the aqueous phase and the organic phase were separated, and the aqueous phase was extracted with ether. Then, the ether phase and the organic phase were mixed, and dried overnight over magnesium sulfate. The desiccant was removed by filtration, and then the ether was removed by distillation. The residue was subjected to vacuum distillation at 54° C. and 0.2 mmHg to give 24 g of product B. Since the resulting product contained impurities, it was purified by column chromatography using a cyclohexane/chloroform eluent, whereby allyloxymethylstyrene monomer was obtained.

Example 6

Synthesis of Allyloxymethylstyrene Polymer 1

The allyloxymethylstyrene monomer (100 ml) obtained in Example 5, and 0.006 mol of the polymerization initiator 2,2'-azobisisobutyronitrile (AIBN) were charged into a Pyrex polymerization tube. The polymerization tube was sealed under a nitrogen atmosphere, or after a freeze-pump-thaw cycle was performed three times, i.e., for 30 minutes, for 40 minutes and for 50 minutes, and the tube was sealed in a vacuum. Then, the reaction mixture was allowed to stand for 24 hours at 60° C. in a temperature-controlled bath to carry out polymerization. The polymerization was stopped by quenching the polymerization tube with ice. Then, the reaction mixture was poured into methanol as a precipitant to give a polymer as a white powder. The precipitated polymer was isolated by filtration through a glass filter. Methanol was removed, and the residue was dried for 48 hours or more in a vacuum drying equipment to give allyloxymethylstyrene polymer 1. Based on the ratio between the absorption intensity of phenyl protons and the absorption intensity of pendant olefins, detected by the H-NMR spectrum of the resulting polymer, the degree of cyclization was 88%. The glass transition point (Tg) determined by DSC analysis was 110° C., and the thermal decomposition point determined by TG analysis was 350° C. Moreover, TDS analysis showed the moisture content of this polymer to be 0.006%. The number average molecular weight (Mn) was 5,500.

Example 7 (Synthesis of Allyloxymethylstyrene Polymer 2)

Allyloxymethylstyrene polymer 2 was obtained in the same manner as in Example 6, except that 100 ml of the allyloxymethylstyrene monomer, and 0.006 mol of cumene hydroperoxide (CHP) as a polymerization initiator were charged into the polymerization tube, and the polymerization temperature and the polymerization time were set at 120° C. and 24 hours. The degree of cyclization determined by the H-NMR spectrum of the resulting polymer was 96%. The glass transition point (Tg) determined by DSC analysis was 100° C., and the thermal decomposition point determined by TG analysis was 370° C. Moreover, TDS analysis showed the moisture content of this polymer to be 0.006%. The number average molecular weight (Mn) was 3,000.

Comparative Example 1

Commercially available thermoplastic norbornene-based resin ("ZEON EX280", Zeon Corporation, Japan) was used as resin, and evaluated in the same manner as above. The glass transition point (Tg) determined by DSC analysis was 135° C., and the thermal decomposition point determined by TG analysis was 340° C. Moreover, TDS analysis showed the moisture content of this polymer to be 0.010%.

Comparative Example 2

Commercially available thermoplastic polycarbonate resin ("Panlite AD5503", TEIJIN CHEMICALS LTD., JAPAN) was used as resin, and evaluated in the same manner as above. The glass transition point (Tg) determined by DSC analysis was 125° C., and the thermal decomposition point determined by TG analysis was 320° C. Moreover, TDS analysis showed the moisture content of this polymer to be 0.15%.

[Evaluation of Characteristics]

The results of Examples 2 to 4, Examples 6 and 7, and Comparative Examples 1 to 2 are shown in Table 1.

TABLE 1

Synthesis Conditions and Physical Properties of Allyloxymethylstyrene-based resins

|  | PI | Amount of PI (M) | PTi (h) | PTe (° C.) | DC (%) | Tg (° C.) | TDP (° C.) | MC (%) |
|---|---|---|---|---|---|---|---|---|
| Ex. 2 | AIBN | 0.06 | 24 | 60 | 90 | 220 | 360 | 0.008 |
| Ex. 3 | CHP | 0.06 | 24 | 120 | 96 | 250 | 380 | 0.008 |
| Ex. 4 | CHP | 0.02 | 9 | 140 | 99 | 265 | 400 | 0.008 |
| Ex. 6 | AIBN | 0.06 | 24 | 60 | 88 | 110 | 350 | 0.006 |
| Ex. 7 | CHP | 0.06 | 24 | 120 | 96 | 100 | 370 | 0.006 |
| C. Ex. 1 | — | — | — | — | — | 135 | 340 | 0.010 |
| C. Ex. 2 | — | — | — | — | — | 125 | 320 | 0.150 |

PI: Polymerization Initiator
PTi: Polymerization Time
PTe: Polymerization Temperature
DC: Degree of Cyclization
Tg: Glass Transition Point
TDP: Thermal Decomposition Point
MC: Moisture Content The thermoplastic phenylallyloxymethylstyrene resins of Examples 2 to 4 according to the present invention are highly heat resistant thermoplastic resins having, as material properties, a very high glass transition point of 220° C. or higher and a high thermal decomposition point of 360° C. or higher, in comparison with the commercially available thermoplastic resins of Comparative Examples 1 to 2. Compared with conventional thermoplastic injection molding resins, therefore, the resins of the present invention can be molded under high fluidity molding conditions, such as a molding resin temperature of 350° C. or higher and a mold temperature of 160° C. or higher, as molding conditions, for example, for injection molding. Thus, molded articles with reduced residual stress, minimal surface roughness and few waves can be obtained. Consequently, the resulting molded articles are excellent in shape stability and surface accuracy even when allowed to stand at high temperatures.

On the other hand, the thermoplastic allyloxymethylstyrene resins of Examples 6 to 7 according to the present invention are highly heat resistant thermoplastic resins having, as material properties, a high thermal decomposition point of 350° C. or higher, although they have a low glass transition point of 100-110° C., in comparison with the commercially available thermoplastic resins of Comparative Examples 1 to 2. Compared with conventional thermoplastic injection molding resins, therefore, these resins of the present invention can be molded under high fluidity injection molding conditions, such as a molding resin temperature of 340° C. or higher, as molding conditions, for example, for injection molding. Thus, molded articles with reduced residual stress, minimal surface roughness and few waves can be obtained. Consequently, the resulting molded articles are excellent in shape stability and surface accuracy even when allowed to stand at high temperatures.

Furthermore, the thermoplastic phenylallyloxymethylstyrene resins and the thermoplastic allyloxymethylstyrene resins of Examples 2 to 4 and 6 to 7 according to the present invention are minimally hygroscopic resins, as compared with the commercially available thermoplastic resins of Comparative Examples 1 to 2. Thus, they can give molded articles which minimally undergo shape changes due to swelling or defect occurrence due to moisture absorption even when allowed to stand at high temperatures.

According to the allyloxymethylstyrene-based resins of the present invention, there can be provided thermoplastic resins which have a three-dimensional stereochemical rigid structure, and thus retain a high glass transition point (high Tg) closely related to mechanical strength characteristics, and high thermal stability (high thermal decomposition temperature) permitting high flow molding, and further possess low hygroscopicity meaning minimal swelling, deformation or deterioration due to moisture absorption.

Since the thermoplastic allyloxymethylstyrene-based resins of the present invention enable highly accurate, highly reliable molded articles to be produced in large quantities and at low costs, their commercial value is extremely high.

The present invention has been described in detail with respect to the preferred embodiments, and it will now be clear that changes and modifications may be made without departing from the invention in its broader aspects, and it is our intention, therefore, in the appended claims to cover all such changes and modifications as fall within the true spirit of the invention.

What is claimed is:

1. A thermoplastic resin comprising structural units of the following formulas (I) and (II):

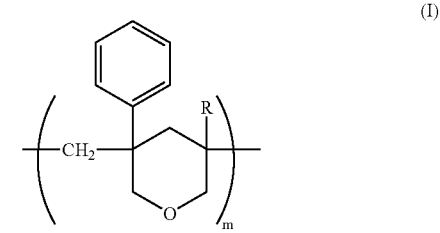

(I)

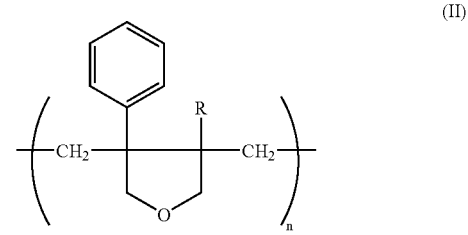

(II)

as repeating units, wherein R represents a hydrogen atom, and m and n each denote an integer of 0 or 1 or higher, provided that m and n are not 0 at the same time, and wherein molecular weight (Mn) of the thermoplastic resin is from 1,500 to 30,000.

2. A thermoplastic resin obtained by polymerizing a monomer having a structure of the following formula (III) by reacting the monomer with a polymerization initiator in a sealed tube at a temperature of 60-140 C.:

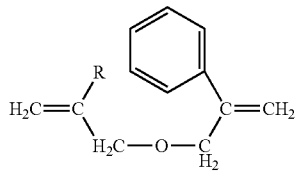
(III)

wherein R represents a hydrogen atom, and wherein molecular weight (Mn) of the thermoplastic resin is from 1,500 to 30,000.

3. The thermoplastic resin according to claim 2, which has a degree of cyclization of 80% or higher.

4. The thermoplastic resin according to claim 2, which has a glass transition temperature (Tg) of 100 C. or higher, but lower than 125 C.

5. The thermoplastic resin according to claim 2 which has a thermal decomposition point of 350° or higher.

6. The thermoplastic resin according to claim 2 which has a moisture content of less than 0.01%.

* * * * *